May 26, 1942.  R. L. HARVEY  2,283,925
HIGH FREQUENCY CORE AND SHIELD AND METHOD OF MAKING THE SAME
Filed April 30, 1937  2 Sheets-Sheet 1
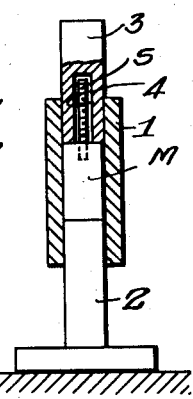
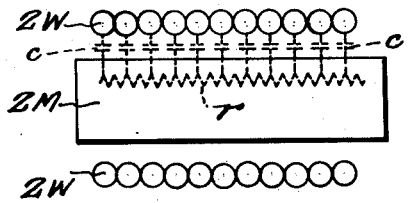
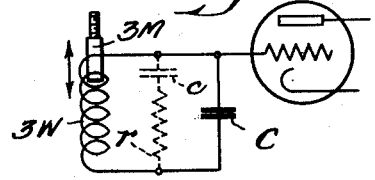
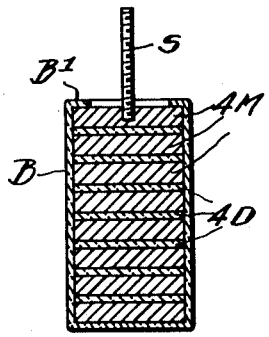
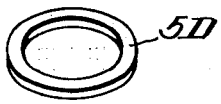
Inventor
Robert L. Harvey
By J. Huff
Attorney May 26, 1942.  R. L. HARVEY  2,283,925
HIGH FREQUENCY CORE AND SHIELD AND METHOD OF MAKING THE SAME
Filed April 30, 1937  2 Sheets-Sheet 2
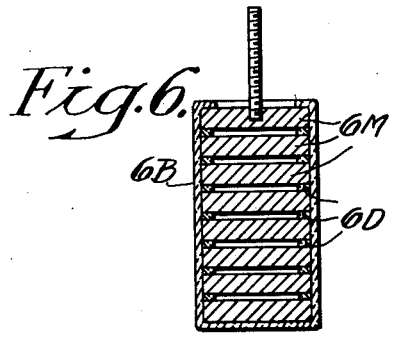
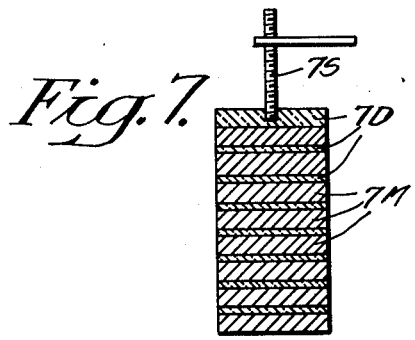
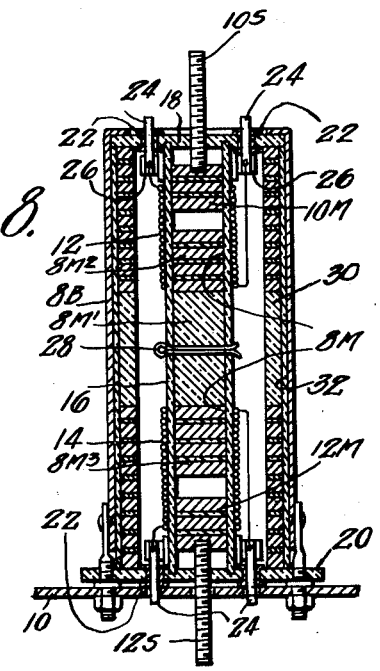
Inventor
Robert L. Harvey
By
Attorney Patented May 26, 1942

2,283,925

UNITED STATES PATENT OFFICE 2,283,925

HIGH FREQUENCY CORE AND SHIELD AND METHOD OF MAKING THE SAME

Robert L. Harvey, Oaklyn, N. J., assignor to Radio Corporation of America, a corporation of Delaware Application April 30, 1937, Serial No. 140,067

16 Claims. (Cl. 171—119)

This application is a continuation in part of a copending application Serial No. 56,993, filed December 31, 1935.

My invention relates to high frequency tuning and coupling apparatus, particularly to inductors having magnetic cores, and has for its principal object to provide an improved magnetic core, and method of making the same, which will have a high permeability and low core loss when disposed in a varying magnetic field set up by radio frequency currents.

Another object of my invention is to provide an inexpensive and trouble-free paramagnetic core which lends itself readily to mass production methods.

Other objects and advantages together with certain details of construction will be apparent and my invention itself will be best understood by reference to the following specification and to the accompanying drawings, wherein—

Figure 1 is a view, in side elevation, partly in section, of a molding device used in forming the molded magnetic material in accordance with my invention, Figure 2 is a side elevational view of a core constructed in accordance with my invention, and placed within an inductor; the drawings being marked with symbols explanatory of certain phenomena peculiar to the operation of the core illustrated, Figure 3 is a circuit diagram illustrative of the phenomena observed in connection with the device of Fig. 2, Figure 4 is an elevational view, in section, of a laminated core constructed in accordance with my invention, Figure 5 is a perspective view of an insulating insert or disc for use in laminated cores, Figure 6 is an elevational view, in section, of an alternative type of laminated core, within my invention, and employing the insulating disc of Fig. 5, Figure 7 is an elevational view, in section, of a composite laminated core within my invention and including an adjusting screw and grounding plate therefor, and Figure 8 is an elevational view, in section, of a coupling unit including a laminated paramagnetic core and shield constructed in accordance with my invention.

For many years it has been known that paramagnetic material operatively disposed in the field of an inductor used in radio frequency work produces certain desirable electrical advantages, provided the material is in such form and arrangement as to minimize energy-consuming eddy current and hysteresis losses.

The most satisfactory cores for coils heretofore used in high frequency circuits have consisted of extremely finely divided or comminuted magnetic material, such as iron dust, held together with a suitable insulating binder. As an example of extreme fineness of subdivision, it has been considered necessary to use pure iron powder small enough to pass through a 300 mesh screen for use with inductors adapted for the broadcast frequency range of 550–1500 kilocycles. Producing such finely divided material, as by chemical reduction of iron oxide, is expensive, as is the cost of production of the finished molded core. It has been necessary, because of the low resistance of the iron, to provide that the particles be well insulated electrically from each other to reduce eddy current losses; in some cases the particles of pure iron, or alloy, have been oxidized, and in other cases an insulating powder has been mixed with the iron powder to minimize electrical contact between the particles. This too contributes materially to the cost of the finished molded core.

The problem of manufacturing satisfactory cores for operation at radio frequencies is quite different from that of cores for audio frequency work for, as will hereinafter more fully appear, in the case of cores for radio frequency work the problem of limiting the "internal capacitance" arises. I am aware that iron oxide was proposed many years ago for loading coils in telephony, see Lee and Colpitts No. 705,935, but in recent years workers skilled in the art have apparently considered it necessary to go to the trouble and expense of providing pure iron or alloys and have actually taken oxide of iron and reduced it by various processes to pure iron. Whereas Lee and Colpitts disclosed that ferroso-ferric oxide ($Fe_3O_4$) was suitable for loading coils, they apparently considered it necessary to go to the trouble of producing it synthetically. Superficial tests with the ore magnetite would lead one skilled in the art to the belief that the material is unsatisfactory, but after considerable research I have discovered ways and means whereby magnetite, inexpensive and rather plentiful, may be employed successfully for the purposes disclosed without changing chemically the form of the ore.

According to "Dictionary of Applied Chemistry," Thorpe, vol. 13, 1912 edition, page 378, the following definitions are given:

"Magnetite, or magnetic iron-ore.—A mineral of the spinel group, consisting of magnetic oxide of iron, $Fe_3O_4$ or $FeO.Fe_2O_3$; an important ore of iron (Fe 72.4 p. c.). Sharply developed crystals with bright faces are not uncommon; these belong to the cubic system and usually have the form of the regular octahedron or the rhombic-dodecahedron. Granular to compact masses are, however, more abundant. The colour is iron-black with a dull, submetallic lustre and a black streak. Sp. gr. 5.18; hardness 6. The mineral may be always readily recognized by its strong magnetic character; small fragments are picked up by a magnetised knife-blade. Only occasionally are specimens magnetic with polarity (v. loadstone). As small grains and crystals, magnetite is of wide distribution in many kinds of igneous rocks, especially the darker coloured with a low silica percentage. In such rocks it sometimes forms rich segregations available for mining; as in the Ural Mountains and at Kirunavara and Gellivara in Swedish Lapland. Other important deposits, e. g., some of those in southern Sweden and Norway, have been formed by the metamorphism of pre-existing iron ores, where these have been subjected to the baking action of intrusive masses of igneous rock. Extensive deposits of magnetite are also mined in the crystalline Archaean rocks of the Adirondack region of New York and in Canada."

"Inorganic and Theoretical Chemistry" by Mellor, vol. 8, part 2, page 732: ". . . magnetite exhibits a wide variation in composition, for the extremes in 30 analyses were:

| | Fe as FeO | Fe as $Fe_2O_3$ | FeO; $Fe_2O_3$ |
|---|---|---|---|
| Magnetite (Ideal) Octahedra from Vogelsberg | 24.11 | 48.29 | 1:2.00 |
| | 39.85 | 15.22 | 1:0.38 |
| Sheperd Mountain, Missouri | 1.36 | 63.95 | 1:47.02" |

By commercial analysis I have found that the magnetite giving best results comes from the Adirondacks and is the "ideal" compound as listed in Mellor and described as $Fe_3O_4$ or FeO, $Fe_2O_3$ (Fe 72.4%) in Thorpe. It is noted that the reference "Fe 72.4%" in Thorpe (which is the percentage of iron by atomic weight) is the same as the combined iron percentage in Mellor, i. e., 24.11+48.29=72.4%. The ratio of Fe as in FeO and Fe as in $Fe_2O_3$ is 1:2. The ratio by weight of FeO to $Fe_2O_3$ is about 31:69.

*Magnetite particles size.*—The required fineness of magnetite particles is determined by: First, desired permeability and permissible loss (the finer particle cores have lower loss but lower permeability); secondarly, mechanical strength and appearance (finer particles will make stronger and smoother surface cures). As between permeability and losses, there is an optimum compromise for a certain frequency range. The larger particles give higher permeability because a given mass of ore material is more compact under the condition as formed in nature than when particles are present and molded with a binder synthetically.

For frequencies around 460 kilocycles, I find that magnetite particles passing 40 mesh and held back on 60 mesh screens make the best compromise cores. The magnetite particle size is not very critical over fairly wide ranges of operating frequencies. Thus, cores designed for 460 kcs. may also be used for 175 kcs., although 30–40 mesh appears to be a somewhat better compromise. Likewise, 60–80 mesh is somewhat better than 40–60 mesh for 1000 kcs. and above. A fineness of 325 mesh, or smaller, is desirable for ultra high frequencies of the order of 10,000 kcs.

*Binder.*—The binder serves to hold the magnetite particles together, also as an insulator between magnetic particles, and probably as a lubricant to allow the particles to slide closely together during molding. It should be noted that the same material is used as binder, insulator, and lubricant. For this I prefer to use "Bakelite," a resinous phenol condensation product, preferably starting with uncured Bakelite in powder form and adding a solvent. A synthane Bakelite varnish in liquid form may, if desired, be used. The proportion of binder and magnetite varies with size of magnetite particles and molding process. I have found that a mixture in the ratio of one part by volume of binder to fourteen parts of 40–60 mesh magnetite makes satisfactory cores, according to my invention.

*Molding process.*—The preferred molding process consists of: (a) Mixing fourteen parts magnetite particles and one part dry Bakelite powder in a mill; (b) adding about four parts of the above mixture, by volume, to one part of a liquid solvent such as acetone. As the mixing process is continued, part of the binder solvent will evaporate, and the mass will in time break up and return to a granular mixture, leaving a dry coating of Bakelite insulation on the magnetite particles; (c) pouring the coated magnetite (like sand) into the hopper of the mold and applying about thirty tons pressure per square inch (i. e. about three tons for a ⅜" diameter core) to the mold for cold molding (Fig. 1); (d) removing the cores, cold molded, and placing in an oven, and curing the cores at 150° C. to 200° C. for about two hours.

The correct pressure used in molding magnetite is an important and critical factor in the production of a core having satisfactory characteristics for radio frequency work, as are some of the other factors involved in my process, as will be seen from the following: Whereas it is desirable to employ a very high pressure in molding in order to increase the density of the magnetic material in order to correspondingly increase the permeability, too great a pressure causes the magnetic particles to break through the insulation material with which it is mixed, resulting in increased eddy current loss. Too low a pressure, and resulting lower density of magnetic particles, produces a permeability that is too low for satisfactory results. I have found, however, that because of the relatively high electrical specific resistance of magnetite as compared to pure iron, a much greater amount of points of electrical contact are allowable between particles without unduly increasing losses. This means that a greater density of material may be used.

If too much binding material is used the excess binder displaces magnetite particles and results in a loss of permeability. On the other hand, if too small an amount is used, there results a poor insulation between magnetic particles and increased losses.

If the mesh size is too small, there is not enough magnetic material in a given volume, and there is a resulting lowering of permeability. Nature has compressed a maximum amount of magnetic material in a given piece and it appears difficult to duplicate this synthetically by pressing together many fine particles. It is, therefore, desirable, from the point of view of permeability, to employ natural particles as large as possible, compromising with eddy current losses. If the particles are too large the eddy current losses increase for well-known reasons.

Referring to Fig. 1, I have found that a better core is made by the use of a double end pressure mold. A mold sleeve 1 forms with a base plunger 2 a hopper into which the magnetic mixture is poured for forming the core M with an adjusting screw insert S. An upper plunger 3, having a recess 4 to accommodate the screw S, fits snugly into the upper end of sleeve 1. The sleeve fits snugly around the plungers and is free to move with respect to both plungers as the pressure is applied to the upper end of plunger 3, thereby resulting in a compressed core of uniform density throughout. As will hereinafter more fully appear an inner lining for the shield may be made in the same manner as described for the core, with suitable changes made in the mold.

The adjusting screw may be molded in the cores initially, or the cores may be drilled out and the screw inserted, and cemented with a drop of collodion or liquid Bakelite after one hour of heat treatment, followed by a second heat treatment of one hour.

In Fig. 2 I show a core 2M of magnetite which may be molded in the manner described in connection with Fig. 1 and having a wire 2W, constituting an inductor wound thereabout. In Fig. 3 I show the core, here designated 3M and coil 3W connected in parallel with a condenser C. Here the condenser and coil constitute a tuned circuit, the frequency of which may be altered by moving the core 3M within the coil 3W, in a well known manner. The resistance of magnetite cores manufactured in accordance with my invention is of a finite value sufficiently high to reduce eddy current losses below the point whereat such losses are disturbing. This internal finite resistance, indicated in Fig. 2 by the phantom resistor $r$, together with the capacitance inherently present between the coil turns and the surface of the core (indicated at $c$) provides a capacitive path through the device. When the device is connected in the circuit of Fig. 3 the resistance $r$ of the core together with the coil-to-core capacitance $c$ in effect provides a shunt path between the tuning inductance 3W and tuning condenser C which may operate to lessen the efficiency of the circuit due to the $I^2R$ loss occasioned by the very presence of such "phantom" shunt path.

I find, in accordance with my invention, that the above described $I^2R$ losses incident to the use of a core formed of magnetite may be substantially obviated by forming the cores of alternate layers of paramagnetic composition and insulation. This, in effect, introduces a number of miniature condensers in the body of the core which, in effect, are series connected with the capacitance $c$ virtually present between the coil winding and the surface of the core.

Since the total capacity of a number of condensers connected in series is equal to the reciprocal of the sum of the reciprocals of the capacities of the individual condensers, it follows that the total capacitance between the terminals (through the core) of a transformer employing a laminated magnetic core is less than that obtaining in a similar transformer employing an unlaminated core.

In Fig. 4 I have shown one form of laminated magnetic core constructed in accordance with the principle of my invention. Here the core comprises a "stack" constituted of alternate blocks 4M of magnetite and insulation which may be in the form of discs 4D enclosed in an insulating container B. A coil, not shown, may be wound on the outer surface of container B, if desired. Preferably, the magnetite blocks 4M are separately molded of the materials and in the manner described in connection with Fig. 1. The discs 4D and the container $b$ may be constituted of Bakelite or other suitable insulating material. The rim of the container B may be crimped as shown at B' to maintain the core elements therein. Where necessary or desirable, the otherwise open end of the container may be sealed against moisture, as by an application of wax or the like.

I have constructed and successfully tested transformers having laminated cores employing from one to eighteen insulating inserts. With the magnetite blocks of from $\frac{1}{16}$" to $\frac{1}{8}$" thick, and of substantially $\frac{3}{8}$" to $\frac{1}{2}$" diameter, spaced by Bakelite discs substantially $\frac{1}{64}$" thick, the improvement in circuit performance was found to be most pronounced when from one to eight insulating discs were employed. Thus, the "Q" of a circuit tuned to a frequency of 4000 kc., and employing a solid magnetite core, was increased from substantially 170 to a "Q" of 230 by substituting a laminated magnetite core (of substantially similar dimensions) having eight separators, for the unlaminated core. The addition of further laminations produced a "Q" of but little higher value.

Referring to Figs. 5 and 6: The insulation interposed between adjacent surfaces of the magnetite blocks need not necessarily be in the form of a flat disc, as shown at 4D in Fig. 4, but may be constructed in the form of an insulating ring 5D (see Fig. 5). Fig. 6 shows a core stack including a number of Bakelite rings 6D interposed between magnetite blocks 6M and mounted in an insulating casing 6B. Here the insulation between the mid portions of adjacent magnetite blocks 6M is of air. Since the dielectric constant of air is $1$ the capacitance between the individual magnetic blocks or sections will be of a desired minimum value.

In Fig. 7 I show a self-supporting "low-loss," laminated magnetite core. Here the alternate magnetite blocks 7M and insulating discs 7D are intimately joined to each other. Such a core may be formed in the mold of Fig. 1 and by the cold molding process heretofore described, in which case a quantity of magnetite and binding material sufficient to form a single preformed lamination is first poured into the mold, and tamped down. Alternatively a "pill" of such compound may be inserted in the mold. A mixture of Portland cement, powdered Bakelite and solvent (mixed and semi-dried preferably in the same manner as the magnetite mixture) and in a quantity sufficient to form a single insulating layer is placed into the mold on top of the magnetite composition. Powdered glass or other suitable ceramic material may be substituted for the Portland cement, if desired. More magnetite composition and more of the insulating mixture is added until the desired number of laminations is obtained. The entire assembly is then subject to a pressure in the mold of about thirty tons per square inch (i. e. about three tons on a ⅜" diameter core), after which the core is removed as a unit and cured in an oven for about two hours, at a temperature of 150° C. to 200° C.

It will be observed, in connection with Fig. 7, that the brass adjusting screw, here designated 7S, is embedded in the outermost lamination 7D, which lamination is formed of the described insulating compound. Such mode of construction is of advantage in instances where it is desirable to ground the adjusting screw without increasing the capacitance of the associated circuit.

Substantially the same process described in connection with Fig. 7 may be employed in forming a low-loss laminated shield or container within which the core of my invention may be disposed. In forming such a shield in accordance with the process of my invention, it is, of course, necessary that the mold be of the contour and dimensions required to ensure the desired shape and size of the finished shield. Such change in the contour of the mold is believed obvious and accordingly has not been illustrated.

In Fig. 8 I have shown a high frequency coupling unit constructed in accordance with the principle of my invention. The coupling unit is housed in a shielding container 8B and is shown mounted on the metal chassis 10 of a radio receiver. The transformer consists of solenoid wound primary and secondary coils 12 and 14, respectively, wound on a sleeve 16 of insulating material such as fiber tubing. The tubing is concentrically mounted within the container 8B by means of end closing plates 18 and 20, respectively. The end plates are provided with eyelets 22 from which depend terminals 24 which in turn support and electrically connect condensers 26. The terminal leads of the coils 12 and 14 are also electrically attached to these terminals.

The transformer coils 12 and 14 are provided with a central core 8M, fixed within the bore of tube 16 as by a pin 28, and are also provided with adjustable cores 10M and 12M, respectively, disposed in sliding relation within the bore of the tube 16, at opposite ends of the fixed core 8M. The adjustable cores 10M and 12M are each provided with adjusting screws 10S and 12S, respectively, for aligning the coils 12 and 14 to a desired resonant frequency.

The fixed core 8M is constituted of a central insulating section 8M¹ and a pair of oppositely located, laminated sections 8M² and 8M³, formed of the materials previously described, and intimately joined to the central section 8M¹ by the described molding process. The adjustable cores 10M and 12M are likewise of laminated construction, as indicated in the drawings.

With the central core 8M in the fixed position shown, under the adjacent ends of the primary and secondary coils 12 and 14, the coupling between these coils will remain substantially constant irrespective of the relative position of the adjustable cores 10M and 12M.

Within the shielding container 8B I show an interlining 30, which may be separated from the walls of the container by a thin sheet of insulating material 32, if desired. The insulation may be omitted and the interliner cemented in the container. This interliner 30 provides a magnetic path which substantially prevents the flux from entering the shield 8B, and effectively reduces the reactive effect of the shielding container upon the coils. Preferably, the interliner is formed of the same materials and is of the same laminated construction as the cores 8M, 10M, 12M in order to ensure a path of minimum capacitance between opposite ends of the windings 12 and 14.

Paramagnetic cores and shields constructed in accordance with my invention are obviously not limited in their useful application to coupling units of the design described, nor is the invention to be limited to the forms of cores or shields shown, since the disclosure in this respect is merely illustrative for purposes of explaining the inventive concept.

What is claimed is:

1. In a radio frequency coupling system, a pair of magnetically coupled inductors, said inductors having turns positioned relatively remote magnetically and turns relatively closely coupled, respectively, a magnetically permeable core for at least one of said inductors, said core being adjustably disposed for operation substantially in the field of the remotely positioned turns thereof, whereby the self-inductance of said one of said inductors may be independently adjusted to a desired value without substantially affecting the coefficient of coupling between said inductors, and separate spaced cores of magnetically permeable material disposed in the fields of said relatively closely coupled turns, respectively.

2. The invention as set forth in claim 1 wherein said separate cores are externally disposed in the fields of said inductors, respectively.

3. The invention as set forth in claim 1 wherein said separate cores include sections disposed, respectively, externally and internally in the fields of said closely coupled turns, respectively.

4. The invention as set forth in claim 1 wherein said separate cores are disposed in fixed spaced relation to each other.

5. The invention as set forth in claim 1 wherein said separate cores are disposed in predetermined fixed magnetic relation to said closely coupled turns, respectively.

6. The invention as set forth in claim 1 wherein said turns and said cores are disposed in coaxial relation.

7. The invention as set forth in claim 1 wherein said separate cores are disposed substantially closer together than are said adjustable cores.

8. The invention as set forth in claim 1 wherein at least one of said cores is laminated transversely for reducing the distributed capacity of said coils.

9. The invention as set forth in claim 1 wherein said separate cores are secured together as a unit in fixed spaced relation by insulation material.

10. In a radio frequency inductor unit, a solenoidal coil, paramagnetic core means longitudinally disposed with respect to the axis of said coil in such closely coupled relation that a substantial amount of distributed capacity exists between said coil and core, forming a phantom capacity impedance path effectively in shunt with said coil, said core means comprising a body of molded comminuted material characterized by the introduction of $I^2R$ losses in said phantom path due to the flow of capacity currents through the core resistance, means for reducing said losses comprising dielectric means separating said core means into layers spaced longitudinally with respect to said coil axis and forming one or more capacity elements in series in said path, said dielectric means being of substantial thickness relative to that of said layers and securing said layers together in fixed spaced relation.

11. In a radio frequency coupling unit, a solenoidal coil and a molded paramagnetic core closely coupled thereto, said core comprising individually insulated granules of magnetically permeable material, dielectric means separating said core into discrete magnetically permeable layers spaced longitudinally with respect to the coil axis a distance that is substantial relative to the thickness of said layers, and forming with said layers an integral molded core structure, said layers being permanently united by said dielectric means in fixed capacity relation.

12. The invention as set forth in claim 11 wherein a binding compound secures together said granules composing said layers and constitutes an element in said dielectric means securing said layers together.

13. The invention as set forth in claim 11 and wherein said dielectric means has a thickness between layers substantially greater than that of thin paper.

14. The invention as set forth in claim 11 and wherein said magnetically permeable layers are spaced a distance greater than ten thousandths of an inch.

15. A low loss molded paramagnetic core for radio frequency inductors comprising discrete layers of granules of magnetically permeable material and of ceramic particles, respectively, and a binder compound for said granules and ceramic particles intimately binding said granules and particles together, respectively, and said layers to each other in an substantially integral molded body.

16. The invention as set forth in claim 15 and wherein one end of said core terminates in a layer of said ceramic particles, and a metallic drive element for adjusting said core.

ROBERT L. HARVEY.